May 22, 1962     J. N. GRESHAM     3,035,507
DOWN-DRAFT WATER WASHED PAINT SPRAY ROOM
Filed July 5, 1960     3 Sheets-Sheet 1

INVENTOR
JOSEPH N. GRESHAM
BY
ATTORNEYS

May 22, 1962 J. N. GRESHAM 3,035,507
DOWN-DRAFT WATER WASHED PAINT SPRAY ROOM
Filed July 5, 1960 3 Sheets-Sheet 2

INVENTOR
JOSEPH N. GRESHAM
BY
ATTORNEYS

May 22, 1962 J. N. GRESHAM 3,035,507
DOWN-DRAFT WATER WASHED PAINT SPRAY ROOM
Filed July 5, 1960 3 Sheets-Sheet 3

INVENTOR
JOSEPH N. GRESHAM
BY
Hanson and Lane
ATTORNEYS

United States Patent Office 3,035,507
Patented May 22, 1962

3,035,507
DOWN-DRAFT WATER WASHED
PAINT SPRAY ROOM
Joseph N. Gresham, 20045 Mendelsohn Lane,
Saratoga, Calif.
Filed July 5, 1960, Ser. No. 40,706
6 Claims. (Cl. 98—115)

The present invention relates to paint spray rooms, and pertains more particularly to a down-draft, water-washed spray room and associated mechanism.

In the past, some spray rooms have been devised wherein a downward flow of air was provided to urge the paint spray laden air of such room downwardly toward the floor. Also, prior mechanisms have been devised using a water spray to remove air borne paint spray particles from air of the spray room before discharging such air to the atmosphere. Such prior developments have not, however, fully solved the problems involved, since they have either been too cumbersome, too expensive, or not entirely satisfactory in their air handling and spray removing characteristics.

The present invention provides an improved, downdraft room for paint spraying, water spray means being provided for removal of air borne paint spray particles from the air as it leaves the room, air evacuating means being provided to maintain an air flow downwardly through the room and through the spray from the water spray means.

The invention also provides a spray room having air inlet means at the top of the room, and a trench extending lengthwise substantially the entire length of the floor thereof, the trench being covered by air admitting grille means capable of supporting the weight of articles to be painted thereon, a re-circulating water spray system being provided beneath the grille means for entraining paint spray particles borne by the air passing downwardly through the grille means, and means for causing the water entrained spray particles to be carried to a main recovery sump from which water is re-circulated and the paint spray particles are removed.

A further object of the invention is to provide a downward air flow, water wash paint spray room into which air is admitted through ceiling ducts, is drawn downwardly by air evacuating means into a trench running lengthwise of the floor of such room, and thence is drawn through lateral duct means the bottom of which are awash with water, the trench having a gutter along one side thereof communicating with a small sump adjacent the gutter, the trench, the gutter, the small sump and the lateral ducts all openly communicating with the main recovery sump.

These, and other objects and advantages of the invention, will be apparent from the following description and the accompanying drawings, wherein.

Figure 1:
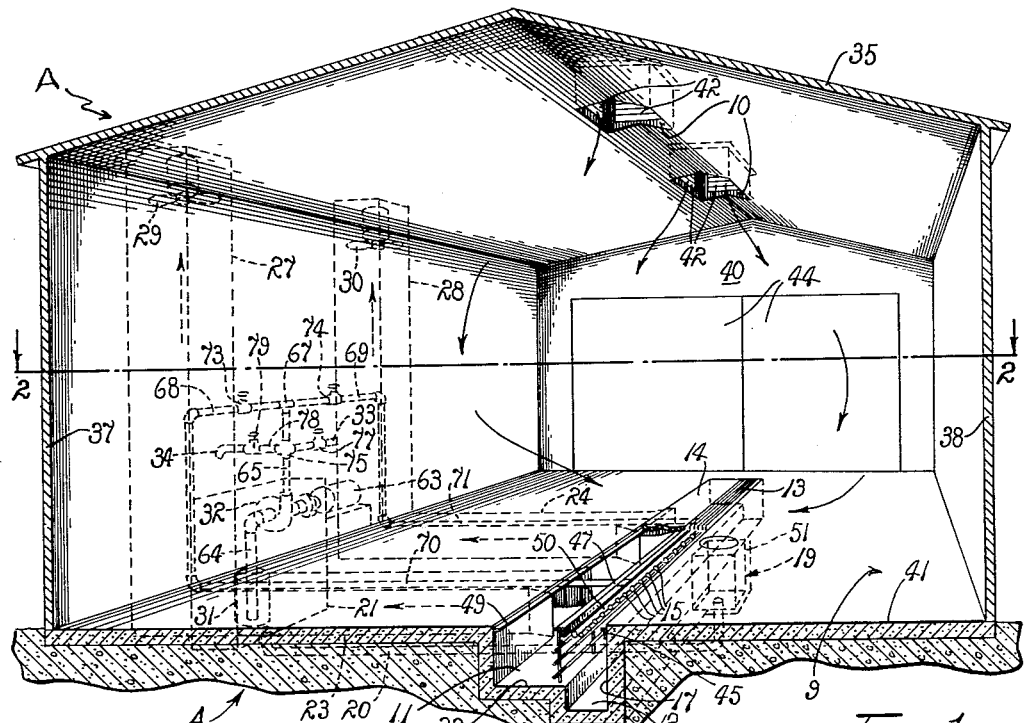
FIG. 1 is a view partially in section and partially in perspective, the section being taken along line 1—1 of FIG. 2.
Figure 2:
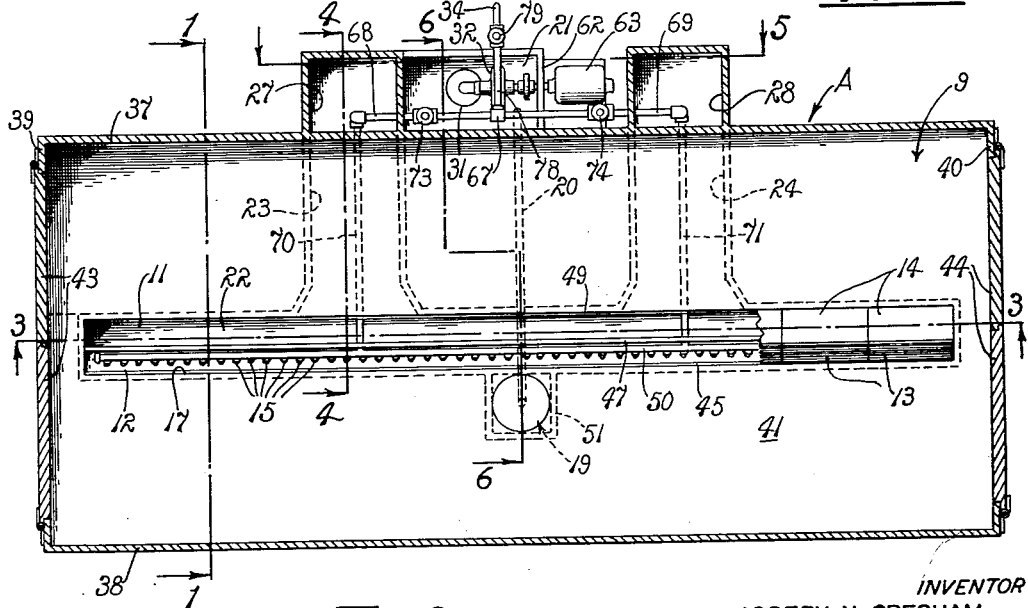
FIG. 2 is a sectional view in reduced scale taken along line 2—2 of FIG. 1.
Figure 3:
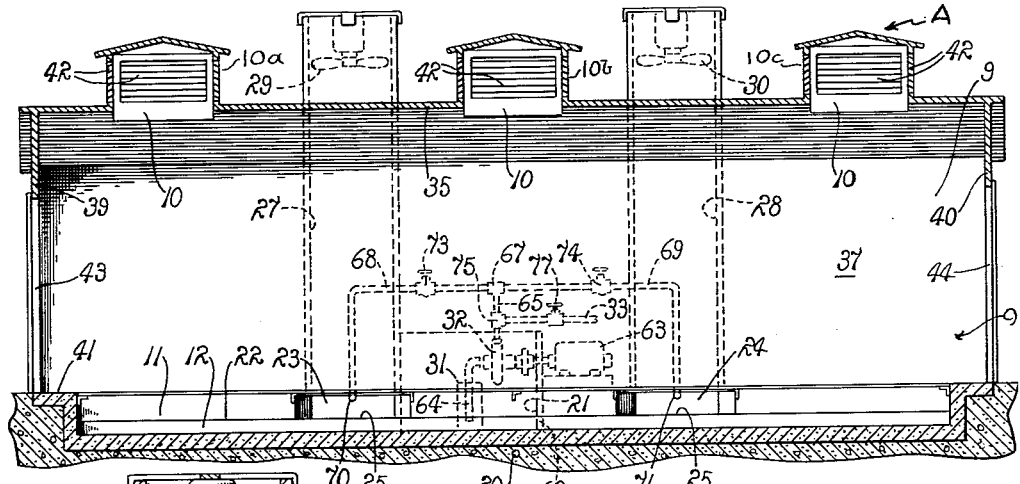
FIG. 3 is a sectional view taken along line 3—3 of FIG. 2.
Figure 4:
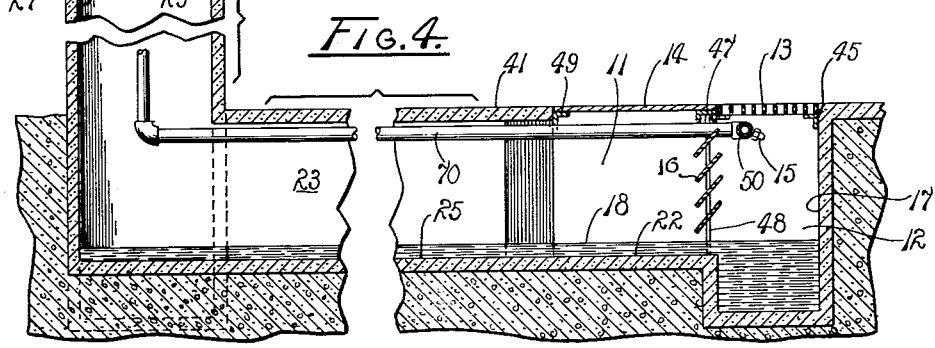
FIG. 4 is an enlarged, sectional view taken along line 4—4 of FIG. 2, intermediate portions thereof being broken away.

Briefly, the illustrated embodiment of the invention comprises a spray room 9 having air inlet means 10 in the roof thereof. A trench 11 extends longitudinally substantially centrally of the spray room 9, with a deeper gutter portion 12 along one side thereof. An air admitting grille 13 covers the portion of the trench over the gutter portion thereof, with steel plates 14 covering the remainder of the trench.

A plurality of spray heads 15 are mounted at spaced intervals lengthwise along the trench 11 beneath the grille 13 and discharge a substantially continuous water spray transversely across beneath the grille to entrain and to remove air-borne spray paint particles from the air. Louvers 16 divide the trench medially longitudinally thereof to equalize and control the air flow therethrough. The spray water flows by gravity down the side wall 17 of the trench 11 into the gutter 12.

Midway of the length of the trench 11, and opening into the gutter 12 below the normal water level 18 (FIG. 6) therein, is a small sump 19. This sump 19 communicates by a pipe 20 with a main recovery sump 21, which preferably is provided exteriorly of the spray room 9. The main recovery sump 21 is substantially larger and deeper than the sump 19, and the normal operating water level 18 in the system is such as to fill the gutter 12 and maintain the bottom 22 of the trench 11 awash with an inch or so of water.

A pair of lateral ducts 23 and 24, the bottoms 25 of which are horizontal and on the same level as the trench bottom 22, communicate the trench 11 with a pair of air evacuating stacks 27 and 28. Each of the latter is provided with suitable air flow inducing means such as fans 29 and 30. The lateral ducts 23 and 24 also communicate at their outer ends with the main recovery sump 21.

Figure 5:
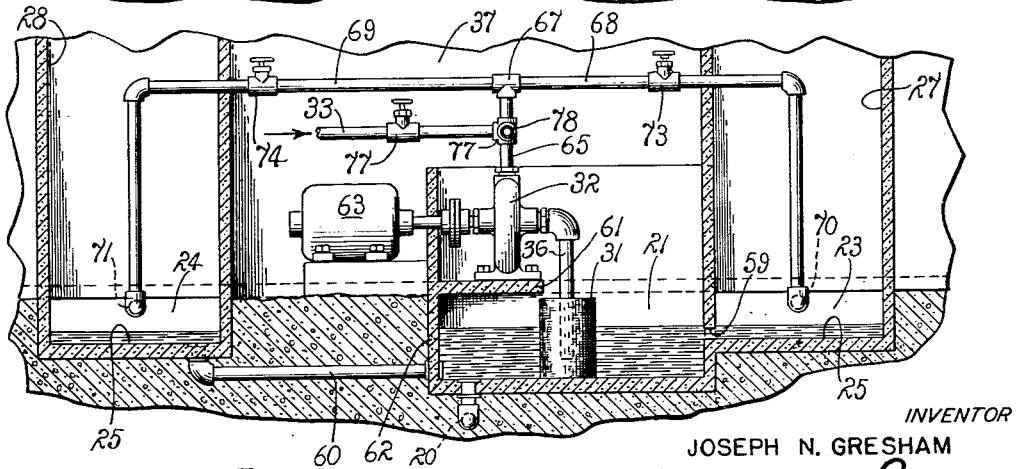
FIG. 5 is an enlarged, sectional view taken along line 5—5 of FIG. 2.

A cylindrical screen 31 (FIGS. 5 and 6) surrounds an inlet pipe 36 leading to a water circulating pump 32, which forces water from the main sump 21 at suitable spraying pressure to the spray nozzles 15.

The pump 32 preferably is provided with a usual back pressure valve (not shown) of a conventional type to keep the pump from losing its prime during periods of inaction.

A water supply line 33 is provided for adding water to the system as needed, and a lateral drain pipe 34 is provided for discharging the water from the system when required.

Referring to the drawings in greater detail, the spray room 9 of the illustrated embodiment A of the invention is a separate building, with roof 35, side walls 37 and 38, end walls 39 and 40, and floor 41. The air inlet means 10 in the roof comprises three separate towers 10a, 10b and 10c, each with louvered openings 42 in its sides.

Doors 43 and 44 are provided one in each end of the spray room 9 of a suitable size for the admission and removal of articles to be painted in said room. These doors preferably have a marginal sealing fit with the walls in which they are mounted in order to insure that most of the inlet air enters through the roof air inlet means 10.

The trench 11 extends centrally throughout substantially the entire length of the spray room 9. The trench bottom 22 is substantially horizontal, and the gutter 12 along one side of the trench extends several inches below the trench bottom 22.

Figure 6:
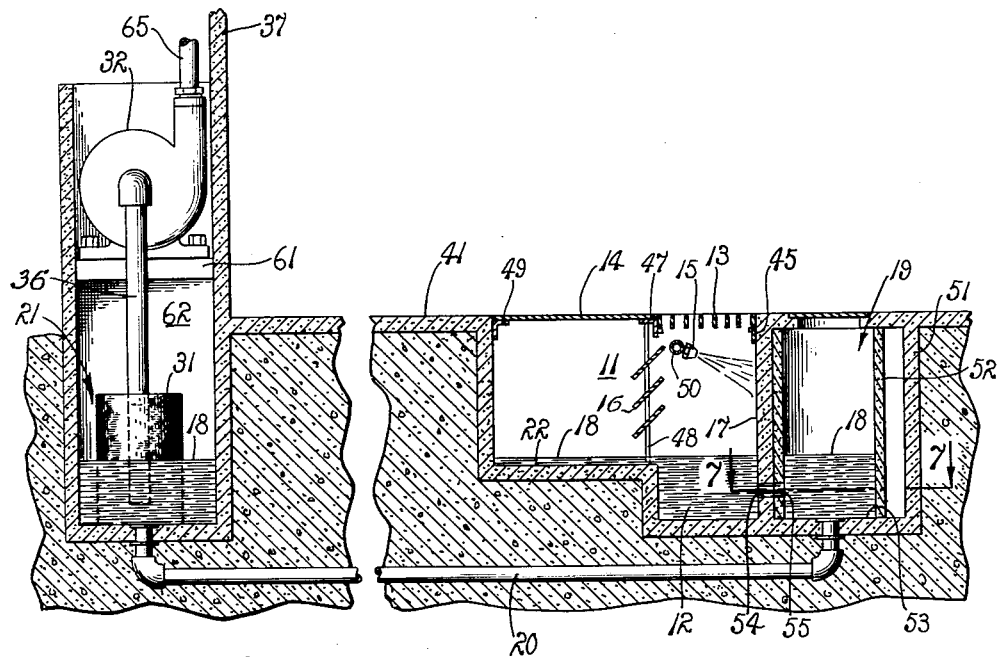
FIG. 6 is an enlarged, sectional view taken along line 6—6 of FIG. 2, intermediate portions thereof being broken away.

The steel grilles 13 are of a type having a large open area, so as to admit a free flow of air therethrough. The grilles 13 are mounted along the gutter side of the trench 11, as best shown in FIG. 6. These grilles are made of a size to permit easy handling. One side of each grille is supported on an angle shelf member 45 secured to the trench wall 17, while the other sides of the grilles are supported on a structural steel girder 47 provided lengthwise along the trench 11 and braced at required intervals by upright posts 48 to support the other side of the grilles, and also one edge of each of the steel plates 14. The louvers 16 are mounted to extend lengthwise of the trench between the posts 48, to which they are rigidly attached. The other side of each of the plates 14 from that supported by the central girder 47 is supported on an angle shelf member 49 secured to the other side of the trench 11 from the angle shelf member 45.

The spray heads 15 are mounted on a pipe 50 which extends lengthwise along the trench 11 beneath the opposite sides of the grilles 13 from the trench side wall 17.

The spray heads 15 are mounted with their axes inclined downwardly, as best shown in FIG. 6, and directed transversely across the under side of the grilles 13 toward the trench side wall 17. The spray heads are positioned at sufficiently close intervals so that a substantially continuous spray of water is discharged from them across beneath the grilles. The angularly downwardly directed spray tends to induce an air flow downwardly through the grilles 13 and thus assists the air circulating fans 29 and 30 in creating a downward flow of air through the spray room and into the trench.

Figure 7:
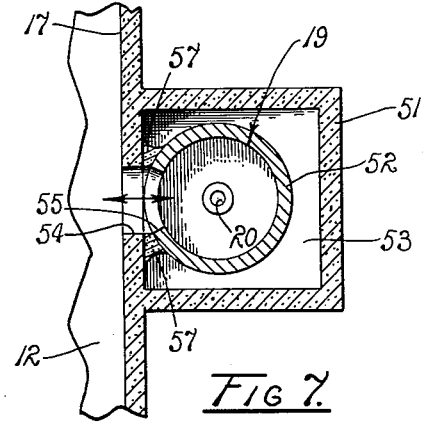
FIG. 7 is an enlarged, fragmentary sectional view taken along line 7—7 of FIG. 6.

The small sump 19 beside the trench 11 comprises a rectangular housing 51 with a cylindrical liner 52 mounted in axially upright position therein. The lower edge of the cylindrical inset 52 is sealed to the housing floor 53. Aligned openings 54 and 55 are provided both in the trench wall 17 and in the cylindrical liner 52, and the space between the trench wall and the liner is sealed around these aligned openings with suitable material, such as concrete 57 (FIG. 7). The aligned openings 54 and 55 are below the normal operating water level 18 in the system, as best shown in FIG. 6, and are also above the bottom of the gutter 12 and of the small sump 19. This arrangement admits water from the gutter 12 into the small sump 19 through the openings 54 and 55, but excludes scum (not shown) which may be floating on top of such water, and also sludge (not shown) which may collect along the bottom of the gutter 12. From the small sump 19 the return pipe 20 communicates with the main recovery sump 21.

The main recovery sump 21 is of substantial capacity, so as to allow plenty of time for the heavier entrained particles carried by the water flowing therein to settle out, and for lighter particles to float to the surface. Since the trench 11, gutter 12, and lateral ducts 23 and 24 all communicate freely with each other and with the main sump 21 the common water level 18 (FIG. 6) tends to be maintained throughout the system. However, since, during operation of the spray heads, water is constantly being withdrawn from the main sump 21 by the pump 32 this action tends to lower the water level in the main sump 21 and thus to induce a gravity flow of water from these other parts of the system toward the main sump.

The lateral ducts 23 and 24 preferably are of substantially the same cross sectional area as the stacks 27 and 28 with which they respectively communicate. These lateral ducts preferably are located about one-third of the length of the trench 11 from each end of the latter. The bottoms 25 of these laterals are horizontal, and are on the same level with the bottom 22 of the trench 11. Therefore, the bottoms of the lateral ducts will be awash with water like the bottom of the main trench 11 at the normal operating level 18 of the system.

The outer end of each of the lateral ducts 23 and 24 is in full open communication with its respective stack 27 and 28, and the air induction means in these stacks, such as, for example, the motor driven axial flow fans 29 and 30 have a sufficient operating capacity to maintain a required air flow through these laterals and stacks to produce a downward flow of air in the spray room 9 sufficient to draw the air of said room with its air borne paint spray particles downwardly through the grilles 13 into the trench 11.

The rear end of the lateral duct 23 communicates through an opening 59 (FIG. 5) with the main recovery sump 21, while the rear end of the other lateral duct 24 communicates with this main sump through the return pipe 60.

A pump mounting shelf 61 is provided on a wall 62 (FIG. 5) of the main sump, and the water pump 32 is mounted on this shelf. The pump 32 has driven connection with an electric motor 63 mounted exteriorly of the main sump 21. The inlet pipe 36 communicates the inlet side of the pump 32 with the main sump 21 well below the normal operating water level 18 in the latter. This inlet pipe is surrounded by the cylindrical screen 31, which is of sufficiently fine mesh to exclude from the inlet pipe 36 water borne paint spray particles carried into the main sump from the other parts of the system.

From the outlet side of the pump 32 an outlet pipe 65 is connected through a T-fitting 67 to laterally extending pipes 68 and 69, and thence, through pipe lines 70 and 71 to the spray head supporting pipe 50. Valves 73 and 74 provided in the laterally extending pipes 68 and 69 control the flow of water from the pump 32 to the spray heads.

A side outlet T-fitting 75 is provided in the main outlet pipe 65 from the pump 32 to the T-fitting 67, and the water inlet pipe 33 from a suitable supply of fresh water such as, for example, a city water supply main (not shown) is connected into this T-fitting. The flow of water through the water supply pipe 33 is controlled by a conventional valve 77 mounted in said pipe. The drain pipe 34, for draining the system when required, is connected into the side outlet 78 of the T-fitting 75, and the flow of water through this drain pipe is controlled by a conventional valve 79 mounted therein. The drain pipe 34, as best shown in FIG. 1, extends laterally outwardly beyond the main sump 21 for the discharge of drain water therefrom into any suitable waste water receiving equipment that may be provided, such as, for example, a conventional tank truck (not shown).

The operation of the illustrated form A of the invention is as follows: For placing the system in condition for operation, the drain valve 79 is closed and the pump 32 is at rest. Fresh water is admitted into the system by opening the valve 77 communicating with the water supply. While thus filling the system, the valves 73 and 74 to the spray heads are open.

Water flows into the system through the pipe 65, the lateral pipes 68 and 69 and the pipe lines 70 and 71 to the spray heads 15, and is allowed to run until a desired operating water level is attained. When a satisfactory water level in the system has been attained, such as, for example, that indicated at 18 in FIG. 6, the flow of supply water is shut off by closing the water supply valve 77.

With the valves 73 and 74 to the spray heads fully open, the fans 29 and 30 are energized, as is also the water pump motor 63, which places the system in operation and ready for use of the spray room 9 for its intended purpose. The combined downward inclination of the sprays from the spray heads 15, plus the suction of the air fans 29 and 30 in the stacks 27 and 28, create an air flow downwardly through the grilles 13 into the trench 11, thereby creating a resultant reduction of air pressure within the spray room 9. The latter is well sealed except for the air inlet means 10 in the roof to insure an adequate downward flow of air from the air inlet means 10 downwardly through the spray room.

As the paint spray laden air passes through the curtain of water spray from the spray heads 15, said water spray entrains most of the air borne paint spray particles and carries the latter downwardly as the water from the spray nozzles flows down the trench wall 17 and into the gutter 12. From the gutter some of the water flows through the aligned openings 54 and 55 into the small sump 19 alongside the trench 11 and thence through the return pipe 20 into the main recovery sump 21.

A surface flow of water also is induced by air friction of the air flowing lengthwise along the trench 11 toward the lateral ducts 23 and 24, and then along these lateral ducts toward their respective stacks. This surface flow urges any scum (not shown) which may be on the surface of the water in the trench and laterals toward the main recovery sump 21. The upper edge of the opening 59 (FIG. 5) from the lateral duct 23 into the main recovery sump 21 is preferably at or just slightly below the normal operating water level at this point so that a large part of this floating scum will be drawn into the main recovery sump without substantial bleeding of air into the stack through this opening.

Scum, sludge, and suspended solid particles in the main recovery sump 21 are prevented from entering the inlet pipe 36 to the pump 32 by the cylindrical screen 31, which is of sufficiently fine mesh as to be effective for this purpose, such as, for example, the approximate size of the spray nozzle orifices.

The lower end of the water inlet pipe 64 is well below the normal operating water level in the system, but is also well above the bottom of the main recovery sump 21, so that the water entering this inlet pipe will tend to draw in a minimum amount of any scum and sludge particles which might pass through the screen 31. Scum and sludge may be removed from the main recovery sump 21 beyond the screen 31 by suitable skimmers, dredges, or other means of any suitable type, either mechanical or manual. Since such means form no part of the present invention they will not be illustrated or described herein.

The invention provides a clean, spray free paint room, with no damaging concentrated air currents. It is simple to construct, and easy and economical to operate.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. In combination with a paint spraying room sealed on its side walls and ceiling, air inlet means opening into the top of said room, a trench extending lengthwise in the floor of said room, an air admitting grille in the floor of said room over substantially the entire length of said trench, a gutter extending lengthwise along one side of said trench, water spray means directed transversely of said trench beneath said grille, a small sump at one side of and substantially midway of the length of the trench and communicating with the gutter below a selected water level therein, a main recovery sump laterally beyond said room, means communicating the small sump with the main recovery sump, a pair of lateral ducts of substantial cross sectional area extending from a side of the trench and beneath the floor of said room and opening to the atmosphere adjacent the main recovery sump, the bottoms of said lateral ducts being of substantial area and at a level to be awash during operation of the spraying room, means communicating the outer end of each lateral duct with the main recovery sump, means for withdrawing water from the sump and supplying such water to the spray means at sufficient pressure to discharge a substantially continuous spray of water from the spray means transversely beneath said grille, means for supplying water to a selected depth in said trench and sumps, air circulating means for drawing air through the lateral ducts and discharging it through the laterally outer ends thereof to draw air inwardly through said air inlet means, downwardly through the room and through the grille into the trench.

2. In combination with a paint spraying room sealed on its side walls and ceiling, air inlet means opening into the top of said room, a trench extending lengthwise in the floor of said room, water spray means directed transversely across the upper portion of said trench, a first sump at one side of and substantially midway of the length of the trench and communicating with the trench below a selected water level therein, a main recovery sump laterally beyond said room, a duct communicating the first sump with the main recovery sump, a pair of lateral air ducts of substantial cross sectional area extending from a side of the trench and beneath the floor of said room and opening to the atmosphere adjacent the main recovery sump, the bottoms of said lateral ducts being on substantially the same level as the bottom of the trench, means communicating the outer end of each lateral duct with the main recovery sump, means for withdrawing water from the main recovery sump and supplying such water to the spray means at sufficient pressure to discharge a substantially continuous spray of water from the spray means transversely of said trench, means for supplying water to a selected depth in said trench and sumps sufficient to cover the bottoms of the trench and of the lateral ducts, air circulating means for drawing air through the lateral ducts and discharging it through the laterally outer ends thereof to draw air inwardly through said air inlet means, downwardly through the room and into the trench, and thence along the trench and lateral ducts toward the outer ends of said lateral ducts.

3. In combination with a paint spraying room sealed on its side walls and ceiling, air inlet means opening into the top of said room, a trench extending lengthwise in the floor of said room, an air admitting grille covering a portion of said trench, a gutter extending lengthwise along one side of said trench, water spray means directed transversely of, and throughout substantially the entire length of, said trench beneath said grille, a small sump at one side of and substantially midway of the length of the trench and communicating with the gutter only below a selected water level therein, a main recovery sump laterally beyond said room, means communicating the small sump with the main recovery sump, a lateral air duct of substantial cross sectional area extending from a side of the trench and beneath the floor of said room and opening to the atmosphere adjacent the main recovery sump, a stack at the outer end of said duct and in open communication therewith, means for supplying water to a selected level in said trench, said lateral ducts and said sumps, means communicating the outer end of each lateral duct below the selected water level therein with the main recovery sump, power driven pump means for withdrawing water from the sump and supplying such water to the spray means at sufficient pressure to discharge a substantially continuous spray of water from the spray means transversely of said trench beneath said grille, air circulating means in said stack for drawing air from the outer ends of the lateral ducts, thereby to reduce the air pressure in the room and induce a flow of air inwardly through said air inlet means, and downwardly through the room.

4. In combination with a paint spraying room sealed on its side walls and ceiling, air inlet means opening into the top of said room, a trench extending lengthwise in the floor of said room, an air admitting grille covering said trench, a gutter substantially deeper than the trench and extending lengthwise along one side of said trench, water spray means directed transversely of said trench beneath said grille, a small sump at one side of and substantially midway of the length of the trench and communicating with the gutter only below a selected water level therein, a main recovery sump laterally beyond said room, means communicating the small sump with the main recovery sump, a pair of lateral air ducts of substantial cross sectional area extending from a side of the trench and beneath the floor of said room and opening to the atmosphere adjacent the main recovery sump, the bottoms of said lateral ducts being at a level to remain awash during operation, means communicating the outer end of each lateral duct with the main recovery sump, a pump having its inlet side communicating with the sump, pipe means communicating the outlet side of the pump with the spray means to discharge a substantially continuous spray of water from the spray means transversely beneath said grille, means for supplying water to a selected depth in said trench, lateral ducts, and sumps, air circulating means for drawing air through the lateral ducts and discharging it through the laterally outer ends thereof to draw air inwardly through said air inlet means, downwardly through the room and through the grille into the trench.

5. An arrangement according to claim 4 wherein the grille covers only one half the width of the trench on the side overlying said gutter, the remaining half of the trench being covered by substantially air tight covering means.

6. An arrangement according to claim 5 wherein a plurality of louvers are mounted in vertically spaced, inclined position in the form of a divider longitudinally of the trench below the juncture of the grille and the steel plates to divert air drawn downwardly through the grille by the air circulating means.

References Cited in the file of this patent

UNITED STATES PATENTS

| | | |
|---|---|---|
| 2,086,514 | Saunders | July 6, 1937 |
| 2,810,336 | Sheffer | Oct. 22, 1957 |